United States Patent [19]

Huckenbeck

[11] Patent Number: 4,554,744
[45] Date of Patent: Nov. 26, 1985

[54] SWITCH ASSEMBLY FOR RIFLESCOPE

[75] Inventor: Claus O. Huckenbeck, Tehachapi, Calif.

[73] Assignee: Bausch & Lomb Incorporated, Rochester, N.Y.

[21] Appl. No.: 567,043

[22] Filed: Dec. 30, 1983

[51] Int. Cl.⁴ .............................................. G02B 27/34
[52] U.S. Cl. ...................................... 33/241; 356/251
[58] Field of Search .............. 33/241, 242, 245, 348.2; 356/251, 153, 252

[56] References Cited

U.S. PATENT DOCUMENTS

| | | | |
|---|---|---|---|
| 1,594,068 | 7/1926 | Paulus | 356/247 |
| 2,607,882 | 8/1952 | Arnold | 33/348.2 |
| 3,672,782 | 6/1972 | Akin | 356/251 |
| 3,994,597 | 11/1976 | Calder et al. | 356/251 |
| 4,266,873 | 5/1981 | Hacskaylo | 33/241 X |

Primary Examiner—Harry N. Haroian
Attorney, Agent, or Firm—Christie, Parker & Hale

[57] ABSTRACT

A riflescope having an internal light source for superimposing an illuminated aiming point on the target field of view. A battery compartment at an eyepiece end of the riflescope is enclosed by a cover and switch assembly to be sheltered from moisture and dust. The switch is easily actuated even when the hunter is wearing heavy gloves, and the cover and switch assembly is in releasable engagement with the battery compartment to enable battery replacement without use of tools.

13 Claims, 13 Drawing Figures

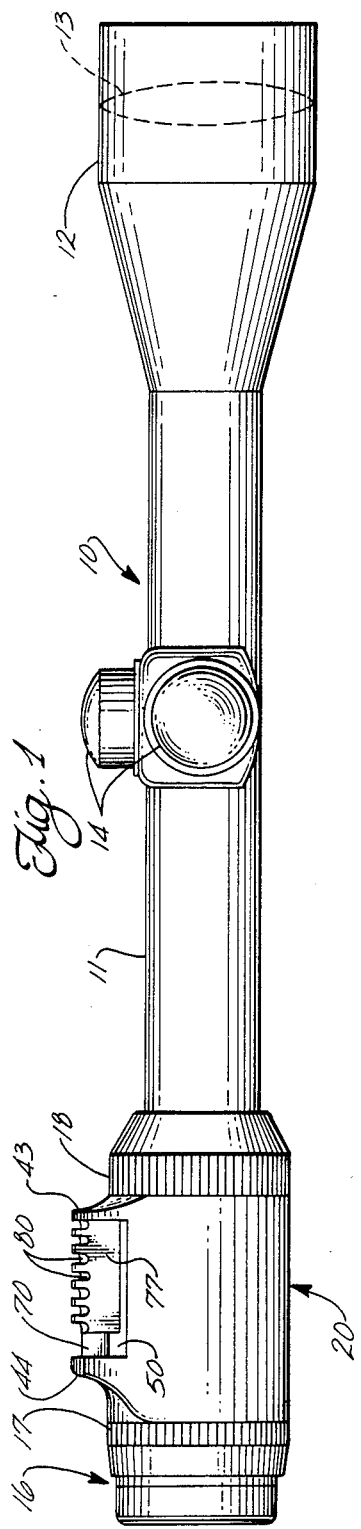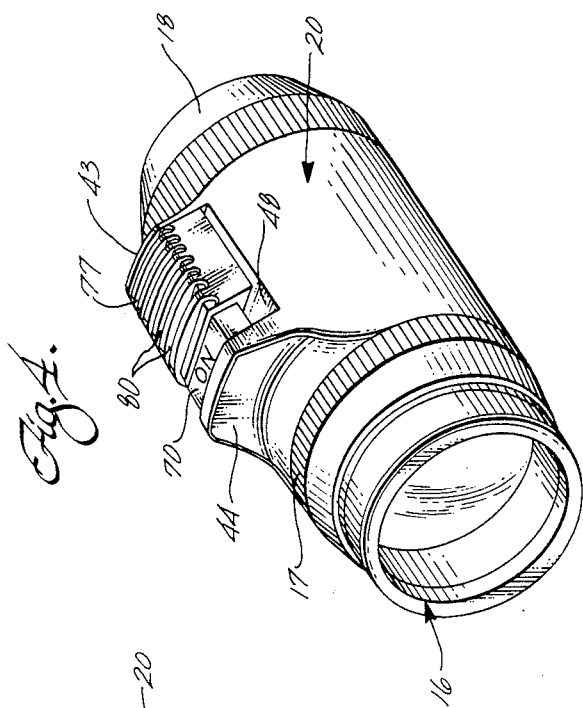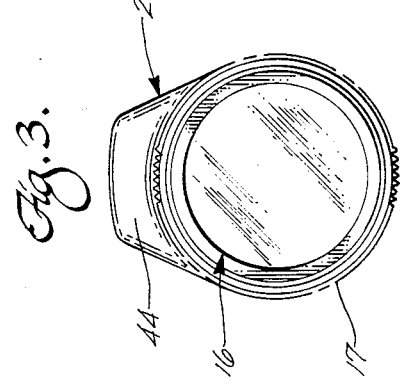

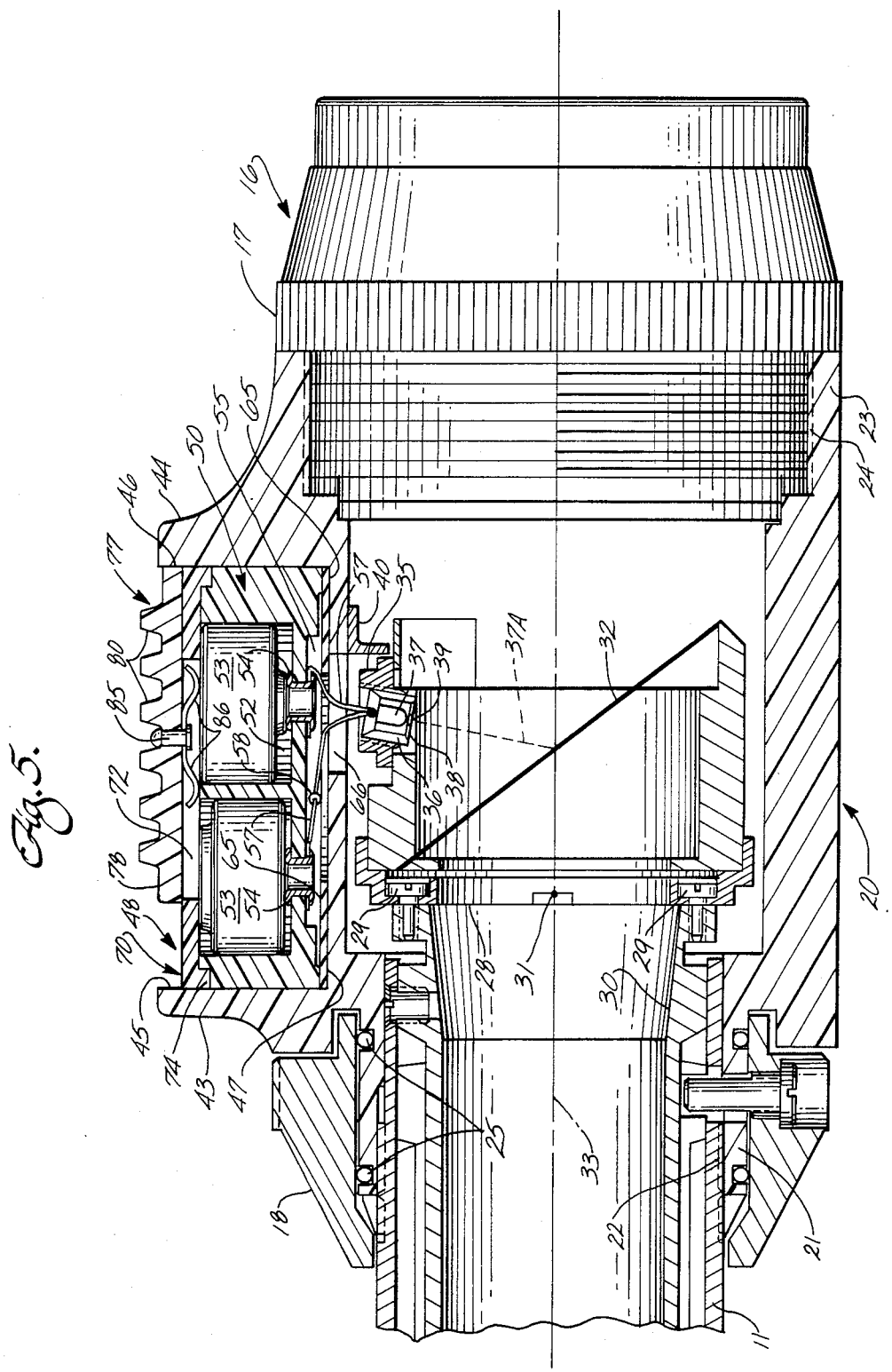

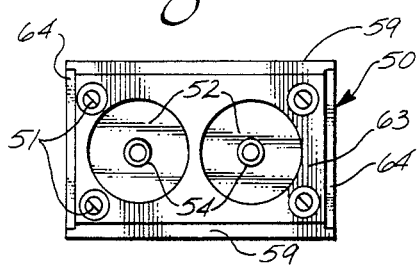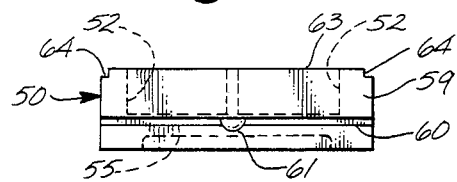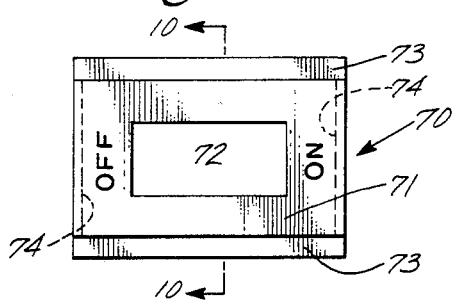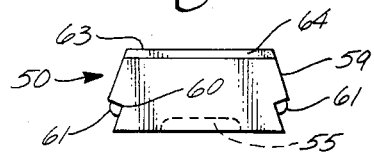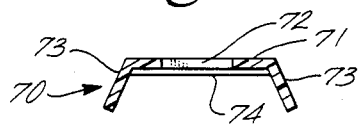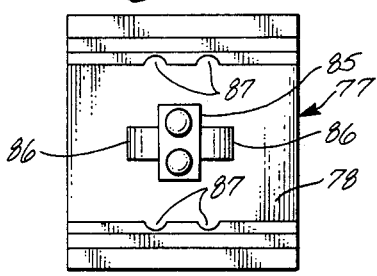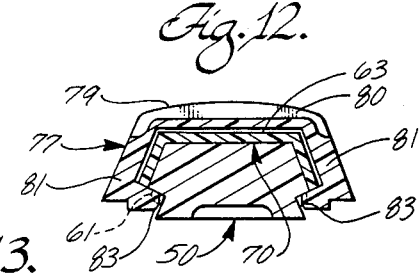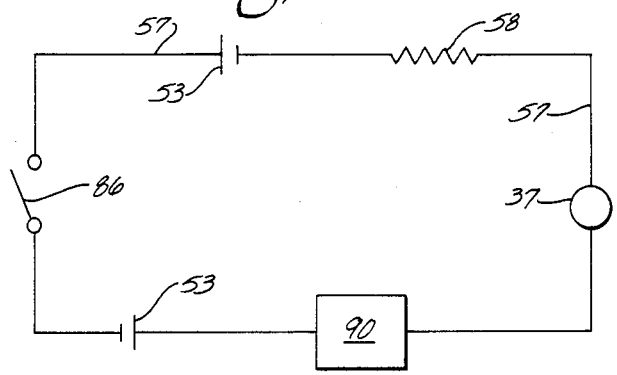

SWITCH ASSEMBLY FOR RIFLESCOPE

BACKGROUND OF THE INVENTION

Telescope sights or riflescopes are used by shooters to enable accurate aiming of firearms such as rifles, pistols, shotguns and the like. These optical sights are typically mounted in a elongated tubular barrel or housing carrying conventional ocular and objective lens systems. An erector-lens system is provided between the ocular and objective systems to provide an erect target image for viewing by the shooter. Windage and elevation adjustments permit the sight to be compensated for targets at varying ranges.

A conventional riflescope includes a reticle, typically of cross hair or post form, which is seen by the shooter in silhouette and superimposed over the target image. The position of the firearm is adjusted until the reticle is positioned on a target-image aiming point. The primary advantage of an optical sight is that the target image and reticle are in the same focal plane, eliminating any need for the shooter to shift eye focus between sight and target as must be done with conventional open sights on a rifle. The optical sight may provide fixed or variable magnification of the target image, but such magnification is not an essential feature and is subsidiary to the primary goal of providing a target image and aiming reticle in a single focal plane.

Conventional reticles are highly satisfactory during conditions of full daylight, but most hunting for game animals is done under restricted lighting conditions before sunrise or just before dark. This is because most game animals are nocturnal feeders, and their search for food is made in darkness or in the relatively short periods just before or after full darkness. A conventional optical sight is difficult to use in these conditions of subdued lighting because the reticle is seen in silhouette against a low-contrast dimly lit image of the target and target background. It is not uncommon for a hunter to lose sight of the reticle entirely while attempting to aim at a game animal standing or moving against a dark background of brush or trees. In such conditions, the firearm cannot be accurately sighted, and the animal will probably escape.

The "fading reticle" problem is solved by illuminating the recticle itself (e.g., electrically heated incandescent reticles have been proposed), or preferably by providing a luminous dot or other mark at the aiming point of the sight. Details of the latter solution are shown in U.S. Pat. No. 3,672,782, the disclosure of which is incorporated herein by reference. Briefly, this patent shows a riflescope with a battery-operated internal lamp which projects a luminous reticle pattern (dot, cross hair, etc.) on the sight field of view and centered on the sight aiming point.

The present invention is directed to an improved illuminated-reticle riflescope having a very compact battery-housing and actuating-switch assembly which enhances the styling of the instrument, and is simple and convenient for the shooter to use. The actuating switch is relatively large for ease of operation when the shooter is wearing heavy gloves, and the switch also serves as a removable closure for the battery housing, enabling rapid and tool-free battery replacement. The removable closure shelters the batteries and switch elements from moisture and dirt, and essentially hermetic sealing of the riflescope interior is not affected by use of the invention.

For convenience, the term "riflescope" is used herein to designate any form of optical sighting device as previously described. That is, the term is used in a generic sense to mean any optical aiming device, whether used on a rifle, pistol, shotgun, archery bow, or the like.

SUMMARY OF THE INVENTION

Briefly stated, this invention relates to an improved switch assembly and battery housing for a riflescope having a light source to provide a luminous aiming point when poor lighting conditions prevent effective use of a normal aiming reticle in the sight field of view. The switch and battery compartment are mounted in a convenient position adjacent the riflescope eyepiece to avoid interference with mounting components of the riflescope, and to enable easy actuation by the hunter. The battery compartment or box is protected against the weather by a cover member and a slidably mounted switch member captively (but releasably) engaged with the box. A high-friction detent means is provided to prevent inadvertent shifting of switch position by firearm recoil forces.

BRIEF DESCRIPTION OF THE DRAWINGS

FIG. 1 is a side elevation of a riflescope incorporating the invention;

FIG. 2 is a top view of the assembly at the left end of FIG. 1;

FIG. 3 is an end view taken from the left end of FIG. 2;

FIG. 4 is a pictorial view of the assembly shown in FIGS. 2 and 3;

FIG. 5 is a sectional elevation of the assembly;

FIG. 6 is a top view of a battery housing block;

FIG. 7 is a side view of the battery block;

FIG. 8 is an end view of the battery block;

FIG. 9 is a top view of a cover member;

FIG. 10 is a sectional view on line 10—10 of FIG. 9;

FIG. 11 is a bottom view of a switch member;

FIG. 12 is a sectional end view of an assembled battery block, cover member, and switch member; and FIG. 13 is a circuit diagram pertaining to the assembly.

DESCRIPTION OF THE PREFERRED EMBODIMENT

A riflescope 10 according to the invention is shown in FIG. 1, and it includes a central body tube 11 with an enlarged end 12 which supports an objective lens 13 (shown in phantom line). A conventional erector-lens system (not shown) is positioned within body tube 11, and the usual windage and elevation adjustments which cooperate with the erector-lens assembly are housed within capped turrets 14 on the body tube.

A conventional ocular-lens assembly 16 is mounted on an end of the riflescope opposite objective lens 13, and is locked in position by a knurled ring 17. Positioned between the ocular-lens assembly and turrets 14 is a rotatable power-change ring 18 for varying the magnification of the riflescope. It is unnecessary, however, that the riflescope be of a variable-power type, and the invention disclosed herein is equally useful in a riflescope of fixed magnification.

Positioned between ocular-lens assembly 16 and power-change ring 18 is a hollow and generally cylindrical housing 20 shown in greater detail in FIGS. 2–4, and in the sectional view of FIG. 5. As best seen in FIG. 5, housing 20 has a cylindrical foward portion 21 having internal threads 22 to receive the threaded rear end of body tube 11. A generally cylindrical rear portion 23 of the housing is similarly provided with internal threads 24 to receive externally-threaded ocular-lens assembly 16. Power-change ring 18 is rotatably mounted on the outer surface of forward portion 21, and these parts are sealed by a pair of O-ring seals 25 to prevent entry of moisture or dust into the interior of the riflescope.

A reticle mounting cell 28 is positioned within housing 20, and is secured by screws 29 to the rear end of a tubular extension 30 of body tube 11. Mounted within the ring-shaped forward end of the reticle mounting cell is a sighting reticle 31 which may be of the usual crosshair style or any other conventional type. Also supported within the reticle mounting cell is a semitransparent film-like pellicle 32 oriented at an angle to an optical axis 33 of the riflescope. If desired, a partially reflecting mirror or equivalent optical arrangement may be substituted for the pellicle. In either case, the function of this optical component is to transmit light rays from the target toward the riflescope eyepiece, while simultaneously permitting reflection of an internally introduced light beam toward the eyepiece. A suitable pellicle will have about 95 percent transmission and about 5 percent reflection of incident light.

Mounted at the top of reticle mounting cell 28 is a small hollow block 35 within which is secured a mounting tube 36 supporting a light source 37. The light source may be a small incandescent lamp, but is preferably a conventional light-emitting diode which is selected to emit red light. An inner end of mounting tube 36 is closed by a disk 38 having a small central aperture 39 which forms a narrow beam of light (suggested by dashed line 37A in FIG. 5) from source 37. A small shield 40 is secured to the upper part of housing 20 just behind block 35 to prevent interference of stray light from light source 37 with the field of view seen through the riflescope eyepiece.

As shown in FIGS. 1-5, a pair of integrally formed, laterally elongated and longitudinally spaced-apart front and rear walls 43 and 44 extend upwardly from the upper surface of housing 20. Forward wall 43 is positioned adjacent power change ring 18, and has a flat inner surface 45 which is perpendicular to the riflescope optical axis. Similarly, rear wall 44 has a flat inner surface 46 which is parallel to surface 45. The outer surface of housing 20 between the lower ends of surfaces 45 and 46 is formed as a flat base surface 47. Surfaces 45-47 thus form an opensided saddle-like rectangular channel 48.

A battery compartment or box 50 makes a snug fit between inner wall surfaces 45 and 46, and is secured against base surface 47 by screws 51 (FIG. 6). As shown in FIGS. 6-8, the battery box is rectangular in planform, and defines a pair of upwardly opening cylindrical recesses 52 for receiving a pair of miniature batteries 53 (FIG. 5). A metal eyelet 54 in the base of each recess forms one contact for each battery.

The undersurface of the battery box defines a recess 55 within which are positioned connecting wires 57 and a voltage-dropping resistor 58 placing the batteries, resistor, and light source in series connection as shown in the schematic diagram in FIG. 13. Preferably, recess 55 is filled with a potting compound (not shown) after the connecting wires and resistor are installed.

Battery box 50 has outwardly sloping and downwardly diverging sidewalls 59, each of which terminates in an inwardly V-shaped and longitudinally extending channel 60. An integrally formed and centrally positioned protrusion or detent button 61 extends from each side of the battery box within channels 60.

An upper surface 63 of the battery box is generally flat, and the front and rear ends of this upper surface define laterally extending shallow recesses 64. As shown in FIG. 5, a flat gasket seal 65 is positioned between the undersurface of the battery box and base surface 47 of channel 48 to prevent entry of moisture or dust into the interior of the riflescope. An opening 66 is formed through the gasket seal and base surface 47 to enable connection of wires 57 to light source 37.

A battery-box cover member 70 (FIGS. 5, 9-10, and 12) is internally configured to fit snugly over diverging sidewalls 59 of the battery box. The cover member has a flat top panel 71 with a rectangular and centrally positioned window-like opening 72 therethrough. A pair of diverging sidewalls 73 extend downwardly from top panel 71 at an angulation matching the sloping side wall surfaces on the battery box. A shallow downwardly extending lip 74 extends between the side walls at each end of the top panel. As shown in FIG. 5, lips 74 seat in recesses 64 of the battery box to aid in sealing these components and to prevent relative longitudinal motion therebetween.

A switch member 77 (FIGS. 1-2 and 4-5) is internally configured to make a mating slip fit over the upper surface of cover member 70. As shown in greater detail in FIGS. 11-12, the switch member is generally rectangular in planform, and has top panel 78 with a rounded upper surface 79 defining a series of longitudinally spaced lateral ribs and grooves 80 which provide a good gripping surface.

Extending downwardly from side edges of the top panel 78 are a pair of diverging sidewalls 81 which are angled to match the slope of sidewalls 73 on the cover member. The lower end of each side wall 81 defines an inwardly extending and generally V-shaped rib 83 shaped to engage mating channels 60 on the battery box (FIG. 12). The switch member is preferably molded from a slightly resilient plastic material (polycarbonate is suitable) so sidewalls 81 can be slightly flexed apart to snap the switch member over the top of the battery box.

As shown in FIG. 11, a metallic contact 85 is secured to the undersurface of the switch-member top panel, and the contact has a pair of longitudinally spaced resilient arms 86 extending downwardly from the top panel. These contact arms bear against the upper surfaces of batteries 53 as shown in FIG. 5 where the arms complete an electrical contact between the two batteries. A rearward positioning of the switch member within channel 48 (FIG. 5) shifts forward contact arm 86 away from the electrically conductive portion of forward battery 53, and thereby breaks the circuit to extinguish light source 37. When the switch member is in a forward position against surface 45 of front wall (e.g., FIG. 4) the contact arms complete a circuit between the batteries to energize the light source.

A pair of longitudinally spaced detent recesses 87 (FIG. 11) are formed in each rib 83 of the switch member to cooperate with detent buttons 61 on the battery box. The ON and OFF positions of the switch member are thus defined by the seating of buttons 61 in the respective detent recesses.

Although the materials forming the riflescope assemblies described above are generally conventional, housing 20 (including integrally formed forward and rear walls 43 and 44) is preferably a diecast metal part. Pellicle 32 is a membrane of Mylar or equivalent plastic film. Battery box 50 is made of an insulating material, and is preferably a molding of polycarbonate or an equivalent plastic. Similarly, cover and switch members 70 and 77 can be conveniently and economically molded from a polycarbonate or equivalent plastic material.

Batteries 53 are preferably Type 76 silver-oxide or alkaline batteries of a commercially available miniature style. As shown in FIG. 9, the battery box cover member preferably includes ON and OFF markings at opposite ends of top panel 78, and the upper surface of the top panel may be in contrasting colors to indicate the condition of the switch. For example, the portion of the top panel bearing the OFF legend may be black in color, and the opposite end portion bearing the ON legend may be red to indicate switch actuation.

When the riflescope is used under normal daylight shooting conditions, switch contact 85 is maintained in the OFF position with switch member 77 in a fully rearward position (toward the eyepiece) within channel 48. When lighting conditions deteriorate to the point where the normal sighting reticle is no longer clearly visible in the shooter's field of view through the riflescope, the switch member is moved to the ON position to close the circuit between the batteries and light source 37. A narrow beam of light is then projected through aperture 39 onto the surface of pellicle 32 to be reflected through the eyepiece toward the shooter's eye. The light source and pellicle are aligned such that the resulting bright spot of light is exactly superimposed on the aiming point (for example, the intersection of a cross-hair recticle) of the riflescope.

The shooter is thus able to substitute the luminous dot in the field of view for the normal reticle aiming point, and to maintain proper aiming of the sight and associated firearm toward the target. The intensity of the luminous dot should be quite low to avoid interference with the target image, and dropping resistor 58 (typically about 750 ohms) is inserted in series connection with the batteries and lamp to provide the desired intensity level. As mentioned above, preferably the light source is a red-emitting LED to further minimize interference with the shooter's vision and target image under diminished lighting conditions.

Use of the novel switch assembly does not interfere with effectively hermetic sealing of the riflescope interior to prevent entry of dust or moisture which will degrade or interfere with the optical components within the site. Cover and switch members 70 and 77 further provide a showerproof enclosure for the battery housing, shielding the battery and switch components from dirt and rain. The cover and switch members thus provide both a switching function, and a sheltering function for the riflescope illumination system.

Battery replacement is easily done by outwardly flexing sidewalls 81 of the switch member so the switch and cover members can be removed from the battery box. After fresh batteries are installed, the switch and cover members are snapped back over the battery box. Cover member 70 is always captively retained within the switch member, because extreme flexing of the switch-member sidewalls is required before the cover member can be dropped between ribs 83, and longitudinal escape is prevented by contact arms 86 abutting the edges of the top panel 71 surrounding opening 72.

In contrast to other illuminated-reticle sights, the low-profile switch arrangement of this invention is both compact and compatible with the styling requirements of modern riflescopes. The switch and battery components are also mounted at the ocular-lens end of the riflescope well away from the central body tube to avoid interference with mounting rings or brackets (not shown) needed to secure the sight to a firearm, archery bow, or similar device.

Grooves 80 in the upper surface of the switch member enable the switch to be actuated quickly and easily even when the shooter is wearing heavy mittens or gloves. The use of detents in the ON and OFF positions of the switch also insure that switch position will not be inadvertently changed by recoil forces when the firearm is fired. The exact arrangement of detents shown in the drawings is not a requirement, and any other style of high-friction sliding support can also be used. The switch is capable of nearly silent actuation without a loud snapping sound which might alert a game animal to the presence of a hunter.

If desired, a conventional time-delay shutoff circuit 90 of a miniaturized solid-state type can be inserted in the lamp circuit (FIG. 13) to extinguish the light source after two or three minutes of operation. This automatic feature avoids battery exhaustion if the switch is inadvertently left in an ON position, but also presents the risk of turning off the lighted aiming point just when a shot is to be made. This feature is accordingly considered to be optional according to the wishes of the user.

What is claimed is:

1. In a riflescope having an optical system for viewing a target image, and including a light source, and means for directing light from the source to provide an illuminated aiming point superimposed on the target image, the improvement comprising:

a compartment on the riflescope for supporting a battery to operate the light source;

a cover member fitted over the battery compartment, the cover member having an opening therethrough;

a switch member slidably and captively fitted on the cover member, and having an electrically conductive portion for completing a circuit between the battery and light source when the switch member is in a first position, and for disconnecting the circuit when the switch member is in a second position, the switch member being of resilient construction to be disengageable to enable tool-free removal of the switch and cover members for battery replacement, and the movable conductive portion bearing directly on the battery in the first position; and the switch and cover members being configured to enclose the battery compartment when the switch member is in either the first or second position.

2. The improvement defined in claim 1, wherein the riflescope has objective and eyepiece lenses, and the battery compartment, cover member, and switch member are positioned adjacent the eyepiece lens.

3. The improvement defined in claim 1, and further comprising detent means on the riflescope and acting on the switch member to resist movement of the switch member in response to recoil forces.

4. The improvement defined in claim 1, wherein the switch member has a ribbed outer surface.

5. The improvement defined in claim 1 wherein the circuit between the battery and light source includes a time-delay circuit for extinguishing the light source after it has been activated for a predetermined time.

6. In a riflescope having eyepiece and objective lenses with a tube extending between the lenses, a light source, and means for directing light from the source to provide an illuminated aiming point superimposed on an image of a target viewed through the lenses, the improvement comprising:

a hollow housing disposed between the eyepiece lens and the tube;

means on the housing defining a battery compartment for supporting a battery to operate the light source;

a cover member releasably fitted over the battery compartment, the cover member having an opening therethrough;

a switch member releasably fitted over the cover member to enclose the cover-member opening, the switch member being slidably mounted on the battery-compartment means to be movable between ON and OFF positions, the switch member further having an electrical contact which contacts the battery in the ON position, and is spaced from the battery in the OFF Position; and circuit means completing a circuit between the battery, switch contact, and light source for energizing the light source when the switch member is in the ON position.

7. The improvement defined in claim 6 where the cover member is captively mounted on the switch member, and the cover and switch members enclose the battery compartment.

8. The improvement defined in claim 7 wherein the switch member is releasably engaged with the housing to enable removal of the switch and cover members for access to the battery compartment.

9. The improvement defined in claim 6 wherein the housing has a pair of spaced-apart upstanding walls with a base surface extending therebetween to define a channel, and wherein the battery-compartment means is a box secured in the channel adjacent the light source, the switch member having a top panel and a pair of spaced-apart sidewalls, the sidewalls being fitted over and in releasably captive sliding engagement with the battery box in the channel.

10. The improvement defined in claim 9, wherein the switch member and battery box have mating sloping sidewalls, the sidewalls defining mating ribs and grooves holding the switch member captively on the battery box for sliding movement between the spaced-apart walls, the switch member having sufficient flexibility to enable disengagement of the ribs and grooves during removal of the switch member.

11. The improvement defined in claim 10 wherein the cover member has a top panel fitted between the undersurface of the switch member and the top of the battery box, the cover member further having a pair of sloping sidewalls fitted between the sidewalls of the switch member and battery box.

12. The improvement defined in claim 11 and further comprising detent means on the switch member and battery box for resisting movement of the switch member in response to recoil forces.

13. The improvement defined in claim 12 wherein the light source is a light-emitting diode which emits red light.

* * * * *